(12) United States Patent
Waxman et al.

(10) Patent No.: US 7,040,257 B2
(45) Date of Patent: May 9, 2006

(54) RETRACTABLE LEASH DEVICE

(76) Inventors: Jared Waxman, 2102 Carlmont Dr., #212, Belmont, CA (US) 94002; Andrew Johnston, 318 Poplar Ave., Redwood City, CA (US) 94061

( * ) Notice: Subject to any disclaimer, the term of this patent is extended or adjusted under 35 U.S.C. 154(b) by 0 days.

(21) Appl. No.: 10/770,926

(22) Filed: Feb. 3, 2004

(65) Prior Publication Data
US 2004/0237906 A1 Dec. 2, 2004

Related U.S. Application Data

(60) Provisional application No. 60/528,893, filed on Apr. 15, 2004, provisional application No. 60/473,307, filed on May 27, 2003.

(51) Int. Cl.
*A01K 27/00* (2006.01)
(52) U.S. Cl. .................. 119/796; 242/384.7; 242/405
(58) Field of Classification Search ............. 119/700, 119/794, 796, 770; 242/381, 384.2, 384.7, 242/400, 404.3, 405, 406, 587, 588; 254/224, 254/262
See application file for complete search history.

(56) References Cited

U.S. PATENT DOCUMENTS

| | | | |
|---|---|---|---|
| 1,826,465 A * | 10/1931 | Gilman | 242/396.9 |
| 3,693,596 A * | 9/1972 | Croce et al. | 119/796 |
| 4,269,150 A | 5/1981 | McCarthy | |
| 4,501,230 A | 2/1985 | Talo | |
| 5,022,351 A | 6/1991 | Daniels | |
| 5,377,626 A | 1/1995 | Kilsby et al. | |
| 5,462,019 A | 10/1995 | Hong Rong et al. | |
| 5,887,550 A * | 3/1999 | Levine et al. | 119/796 |
| 5,983,836 A | 11/1999 | Chavez | |
| 6,148,773 A | 11/2000 | Bogdahn | |
| 6,192,835 B1 | 2/2001 | Calhoun et al. | |
| 6,213,421 B1 * | 4/2001 | Franklin | 242/384.7 |
| 6,371,056 B1 | 4/2002 | Phillips | |
| 6,405,683 B1 | 6/2002 | Walter et al. | |
| 6,523,500 B1 | 2/2003 | Zenteno | |
| 6,526,918 B1 | 3/2003 | Arnold | |
| 6,612,263 B1 | 9/2003 | Scheid et al. | |
| 6,619,313 B1 * | 9/2003 | Boughton et al. | 137/355.16 |
| 2003/0145804 A1 * | 8/2003 | Vaccari | 119/796 |

* cited by examiner

Primary Examiner—Robert P. Swiatek
(74) Attorney, Agent, or Firm—Priest & Goldstein, PLLC

(57) ABSTRACT

A retractable leash device is comprised of a housing with a handle, and a leash wound around an internal reel. The reel is biased by a spring to automatically retract the leash. A momentary unidirectional lock in the housing is arranged to be normally disengaged from unidirectional teeth on the reel. When the momentary unidirectional lock is actuated, the reel is engaged by a ratchet to prevent rotation in the release direction but permit rotation in the retract direction. A toggle lock in the housing is movable between an unlocked position away from the reel, and a locked position between cogs on the reel. A geared rotation damper is engaged with a concentric gear on the reel to limit retraction speed. A clip attached to the housing may be clipped around the leash when the leash is wrapped around a fixed object.

11 Claims, 7 Drawing Sheets

RETRACTABLE LEASH DEVICE

CROSS REFERENCE TO RELATED APPLICATIONS

We claim the priority of provisional patent applications 60/473,307 filed on 27 May 2003, and 60/528,893 filed on 15 Apr. 2004.

BACKGROUND OF THE INVENTION

1. Field of the Invention

The invention broadly relates to retractable leash devices.

2. Prior Art

A retractable leash device is typically comprised of a leash wound around a spring loaded reel inside a housing with a handle. A connector at the outer end of the leash is connectable to a collar on an animal, such as a dog. The leash may be extended or retracted.

The dog's owner may occasionally wish to tether the dog to a fixed object, such as a pole, and leave the dog alone for a while. This may be done by disconnecting the leash from the collar, wrapping the leash around the object, positioning the leash through the loop shaped handle, and reconnecting the leash to the collar. Alternatively, the leash near the housing may be simply tied around the object with a knot. Both methods are inconvenient, and the tying method is unreliable.

The leash is spring loaded to maintain tension on the leash at all times to eliminate slack to avoid tangling and dragging on the ground. A momentary lock and a toggle lock are provided for controlling retraction. The momentary lock prevents the leash from extending or retracting when actuated and frees the leash for extension and retraction when released. The toggle lock prevents extension or retraction when toggled to the lock position without constant finger pressure. Some prior art leashes have separate momentary and toggle locks, and some have combined locks.

When the leash is free to extend or retract, the user has little control over the length of the leash. Shortening the leash requires a cumbersome process which includes extending the user's arm to position the housing closer to the dog, actuating the momentary lock, pulling the dog closer, and releasing the lock to retract the leash. The process is repeated until the leash is retracted the desired amount.

Another disadvantage of prior art retractable leash devices is uncontrolled retraction speed. When the leash is not connected to the dog and the locks are not engaged, the leash is retracted at high speed into the housing. The metal connector at the end of the leash is whipped around during retraction and may strike the user.

BRIEF SUMMARY OF THE INVENTION

Objects of the present retractable leash device are:

to tether an animal to its owner with a leash;
to tether the animal to a fixed object without having to disconnect leash from animal or tying the leash around the object with a knot;
to secure accessories such as poop bags, animal toys, etc.;
to be attachable to the clothing of the user for hands free use;
to automatically maintain tension on the leash to eliminate slack;
to enable stopping the leash from extension but allowing retraction to maintain tension;
to enable stopping the leash from extension or retraction without human input; and
to slow leash retraction for avoiding whiplash.

The retractable leash device is comprised of a housing with a handle, a reel in the housing, a leash wound around the reel and extendable from the housing, and a spring biasing the reel to retract the leash. A momentary unidirectional lock in the housing is comprised of a hinged and spring loaded lever with an inner end biased away from the reel, and an outer end projecting from the handle. A hinged and spring loaded ratchet adjacent the inner end of the lever is biased by the lever to a normally disengaged position away from the reel. When the lever is pressed, its inner end is moved to pivot the ratchet into engagement with unidirectional teeth on the reel to prevent rotation in the release direction, but permit rotation in the retract direction. A toggle lock positioned in the housing is comprised of a sliding bar with an inner end movable between an unlocked position away from the reel, and a locked position between cogs on the reel. A geared rotation damper is engaged with a gear around the reel to limit retraction speed. A clip on the housing is comprised of a notch in the housing, and a gate spanning the opening of the notch for clipping around the leash.

Figure 1:
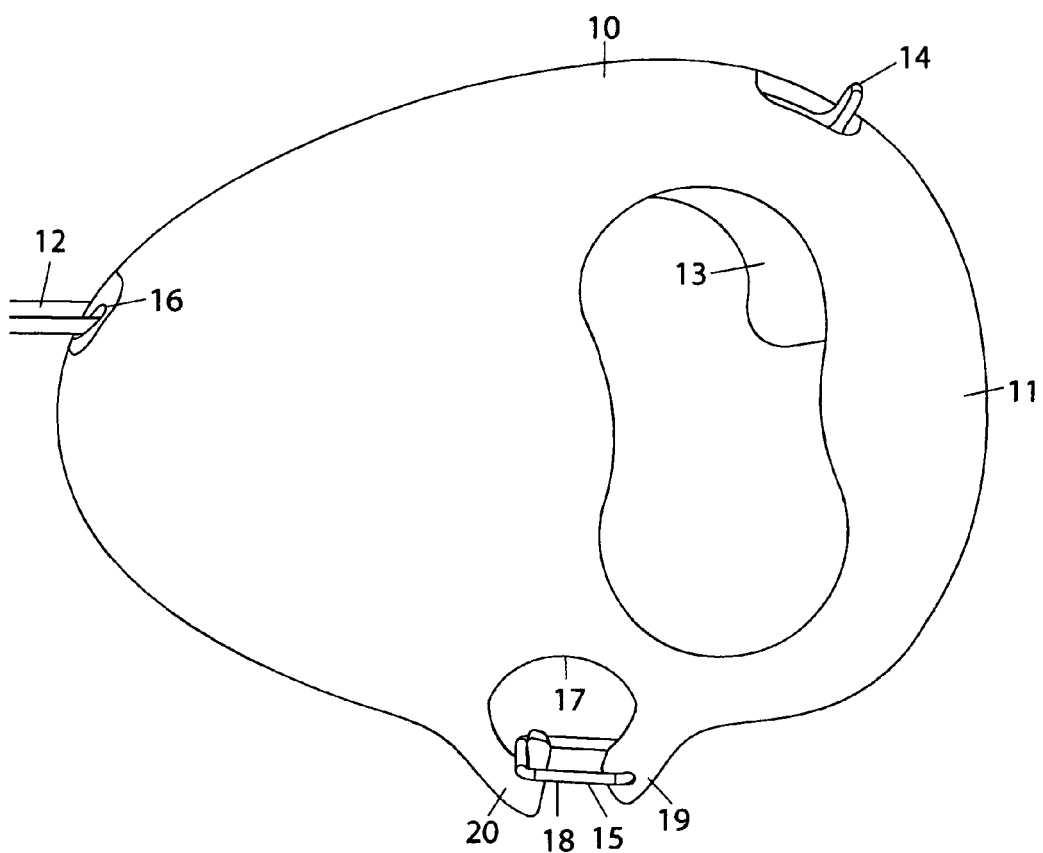
FIG. 1 is a side view of the retractable leash device.

| DRAWING REFERENCE NUMERALS | |
|---|---|
| 10. Housing | 11. Handle |
| 12. Leash | 13. Momentary unidirectional lock |
| 14. Toggle Lock | 15. Clip |
| 16. Slot | 17. Notch |
| 18. Gate | 19. First End |
| 20. Second End | 21. Reel |
| 22. Spring | 23. Inner End |
| 24. Spring | 25. Outer End |
| 26. Ratchet | 27. Spring |
| 28. Ramp | 29. Tooth |
| 30. Lever | 31. Sliding Bar |
| 32. Inner End | 33. Cog |
| 34. Rotation damper | 35. Gear |
| 36. Fixed Object | 37. Fixed Object |
| 38. Housing | 39. Clip |
| 40. Notch | 41. Gate |
| 42. Housing | 43. Clip |
| 44. Handle | 45. Grip |
| 46. Leash Securing Device | 47. Teethed Slot |

DETAILED DESCRIPTION OF THE INVENTION

FIG. 1

A preferred embodiment of a retractable leash device shown in FIG. 1 is comprised of a housing 10 with a handle 11, a leash 12 extending from housing 10, a momentary unidirectional lock 13 projecting from housing 10, a toggle lock 14 projecting housing 10, and a clip 15 on housing 10.

Leash 12 is positioned through a U-shaped slot 16 in housing 10. Momentary unidirectional lock 13 is preferably positioned on an inner side of handle 10 to facilitate finger actuation, and toggle lock 14 is preferably positioned at an outer side of handle 10 to facilitate thumb actuation. In this example, clip 15 is comprised of a notch 17 in housing 10 and a hinged gate 18 spanning notch 17. A proximal end of gate 18 is hinged to a first side 19 of notch 17, and a distal end of gate 18 is snugly engaged behind a recurved second side 20 of notch 17 so that gate 18 can only open inward.

FIG. 2

Figure 2:
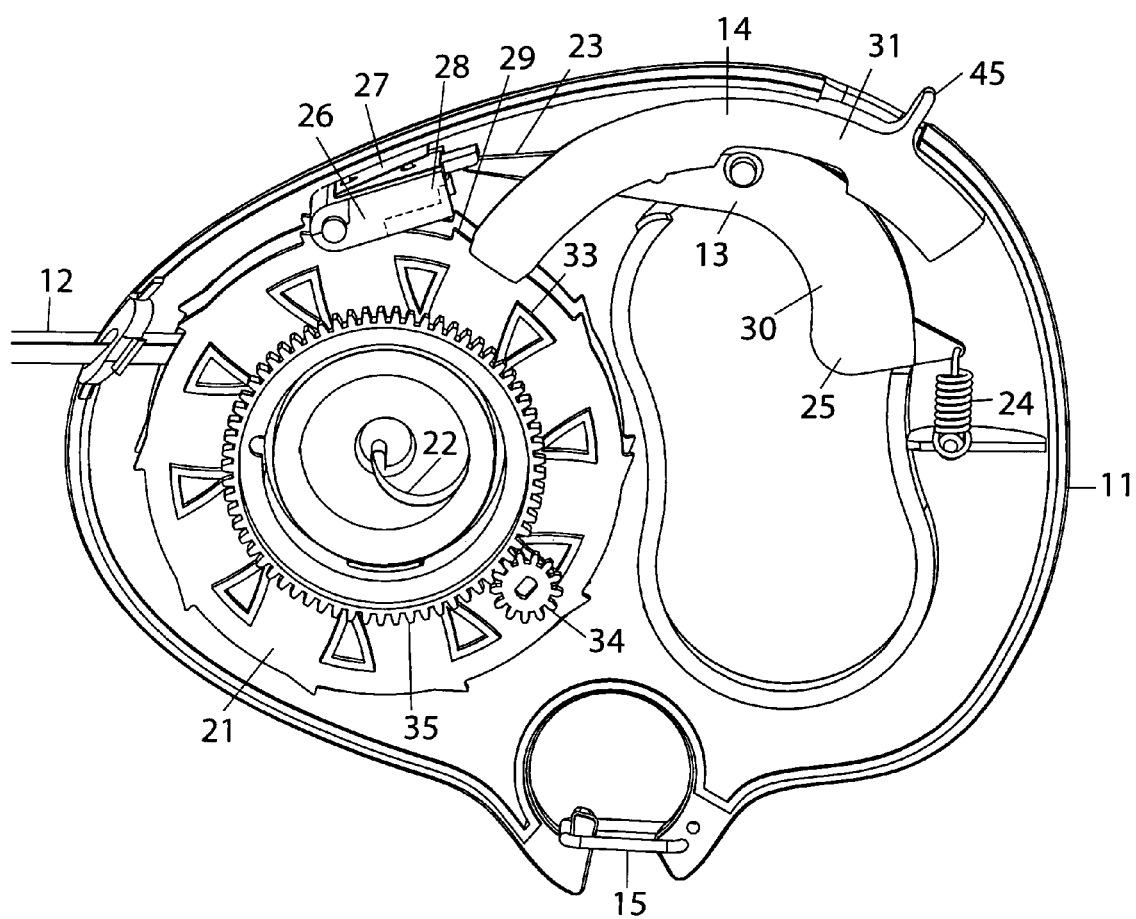
FIG. 2 is a side cutaway view thereof in an unlocked condition.

The retractable leash device is shown in a cutaway view in FIG. 2. The inner portion of leash 12 is wound around a rotary reel 21 inside housing 10. Reel 21 is biased by a spring 22 in a direction to automatically retract leash 12.

Momentary unidirectional lock 13 is comprised of a hinged lever 30 with an inner end 23 biased by a spring 24 from reel 21, and an outer end 25 projecting from handle 11. A hinged ratchet 26 adjacent inner end 23 of lever 30 is biased by lever 30 to a normally disengaged position away from reel 21. Ratchet 26 is biased by a spring 27 towards reel 21, but spring 27 is weaker than spring 24, so that ratchet 26 is biased to the disengaged position against spring 27. A ramp 28 is positioned on an inner side of ratchet 26 for engaging directional teeth 29 around reel 21 that are angled toward ratchet 26.

Toggle lock 14 is comprised of a sliding bar 31 with an inner end 32 movable between a disengaged position away from reel 21, and a locked position between cogs 33 on reel 21. A grip 45 on sliding bar 31 is positioned through housing 10.

A geared rotation damper 34 is engaged with a gear 35 concentrically positioned around reel 21 to limit retraction speed and prevent whiplash if leash 12 is inadvertently released for free retraction. Rotation damper 34 is preferably attached to the side of housing 10 which is omitted in this view. Alternative rotary damping devices for limiting retraction speed include dampening grease, a controlled friction device such as a variable force clutch, an air resistance damping device with fins, etc.

Momentary unidirectional lock 13 and toggle lock 14 are normally disengaged as shown. Reel 21 is free to rotate in either direction for extending or retracting leash 12 as the animal at the end of leash 12 moves away or towards the leash device. Leash 12 is kept taut by spring 22 to eliminate slack.

FIG. 3

Figure 3:
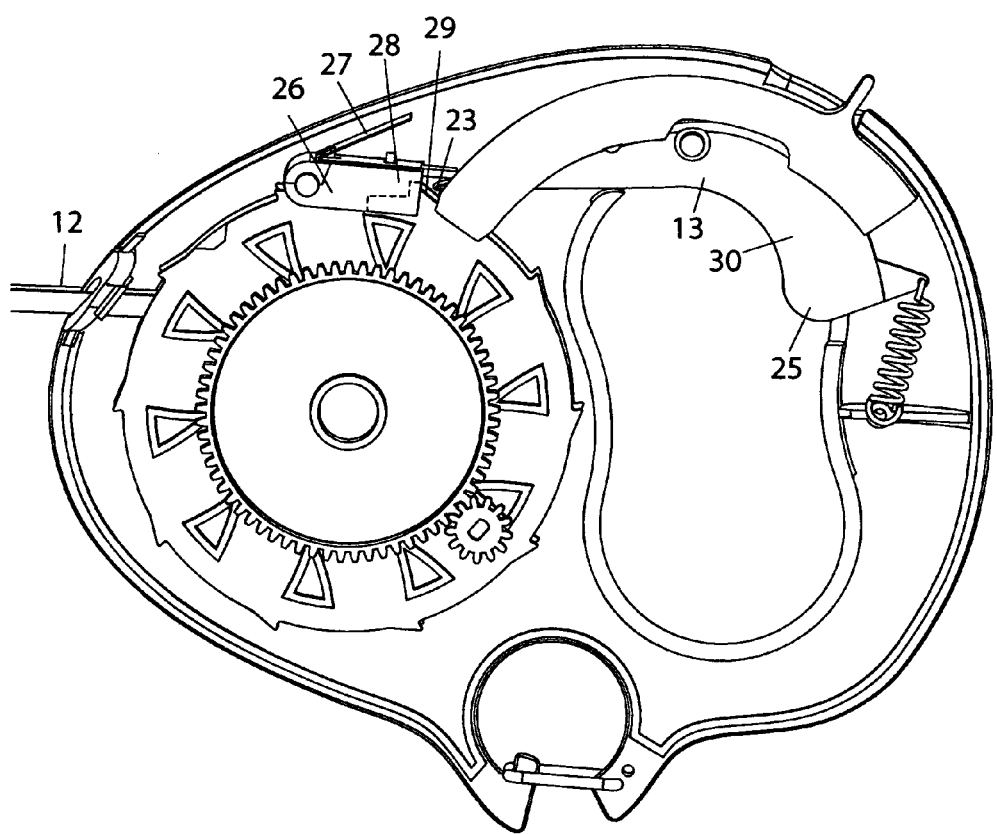
FIG. 3 is a side cutaway view thereof with a momentary unidirectional lock engaged.

Momentary unidirectional lock 13 is engaged in FIG. 3. When outer end 25 of lever 30 is pressed, inner end 23 is moved toward reel 21 and ratchet 26 is biased by spring 27 toward reel 21. Ramp 28 under ratchet 26 is moved into engagement with unidirectional teeth 29 on reel 21 to prevent reel 21 from rotating in the release direction and thus prevent the animal from moving farther away. When the animal moves closer to the leash device, unidirectional teeth 29 on reel 21 are able to slide past ratchet 26 to permit rotation in the retraction direction and thus retract leash 12 to eliminate slack. Ratchet 26 is positioned on top of lever 30 so that ratchet 26 may be pivoted by teeth 29 without moving lever 30.

Instead of ratchet 26 movable into engagement with directional teeth 29 on reel 21, momentary unidirectional lock 13 may be comprised of other devices, such as roller clutches, one-way clutches, etc.

FIG. 4

Figure 4:
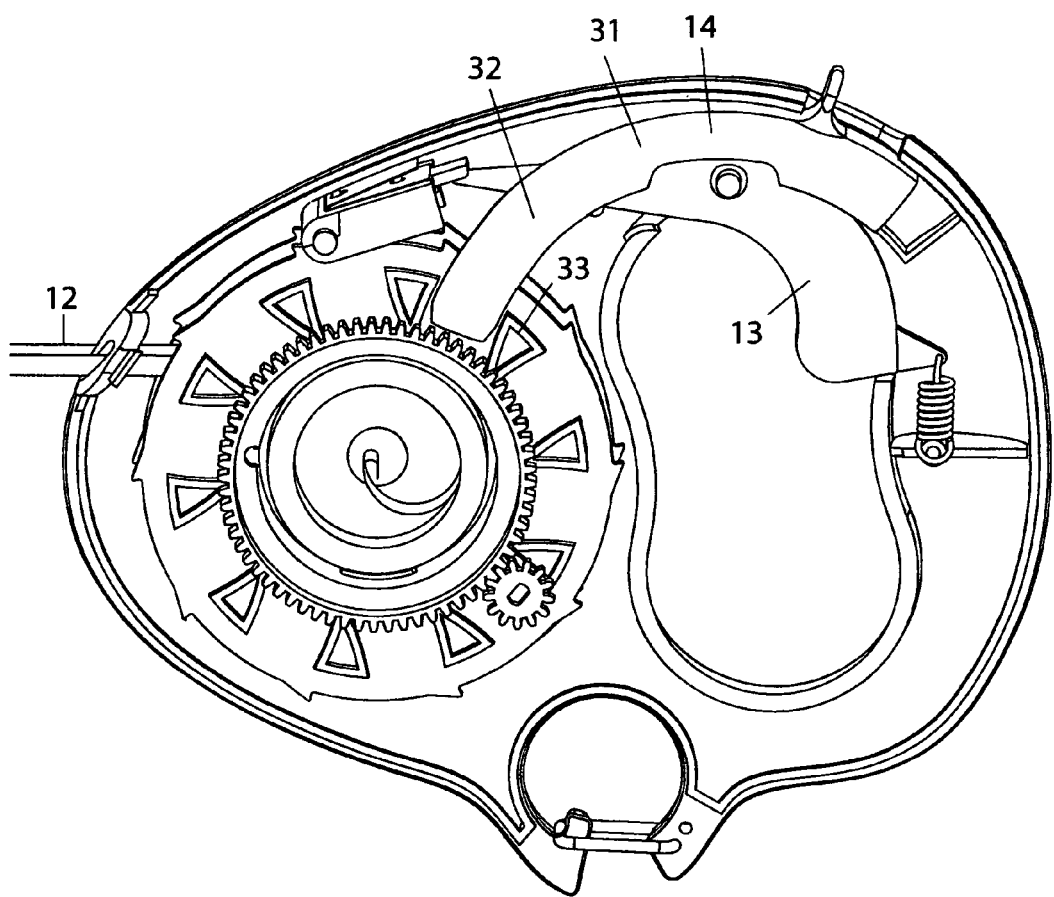
FIG. 4 is a side cutaway view thereof with a toggle lock engaged.

Toggle lock 14 is engaged in FIG. 4. Momentary unidirectional lock 13 is disengaged. Forked inner end 32 of sliding bar 31 is slid toward reel 21 and positioned between cogs 33 on either side of reel 21 to prevent rotation in either direction. Sliding bar 31 has no spring loading so that it stays in its selected position without human input.

FIGS. 5–6

Figure 5:
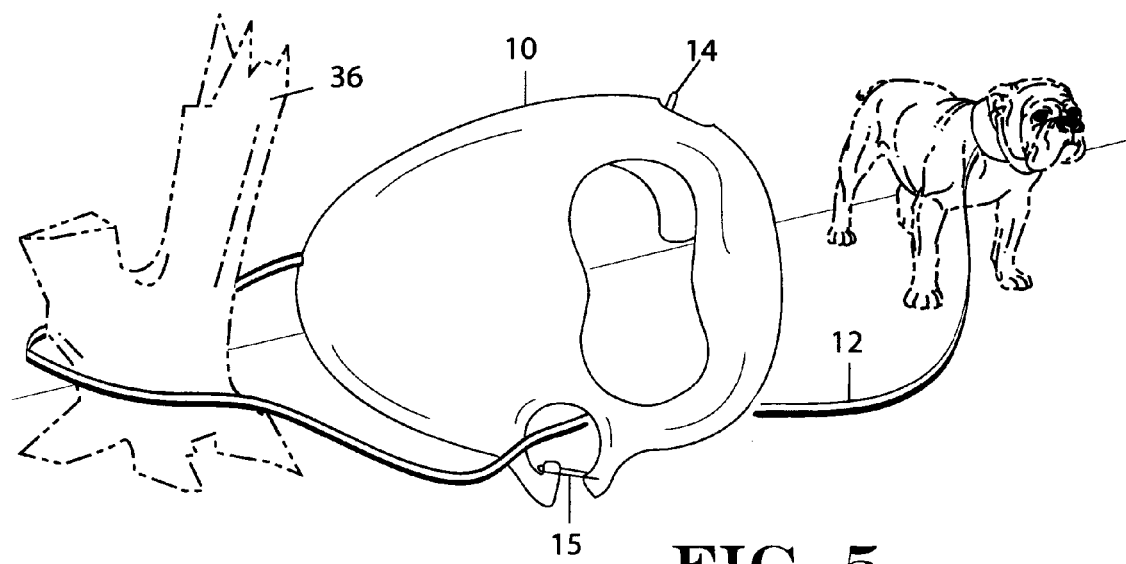
FIG. 5 shows the retractable leash tethered to a tree.
Figure 6:
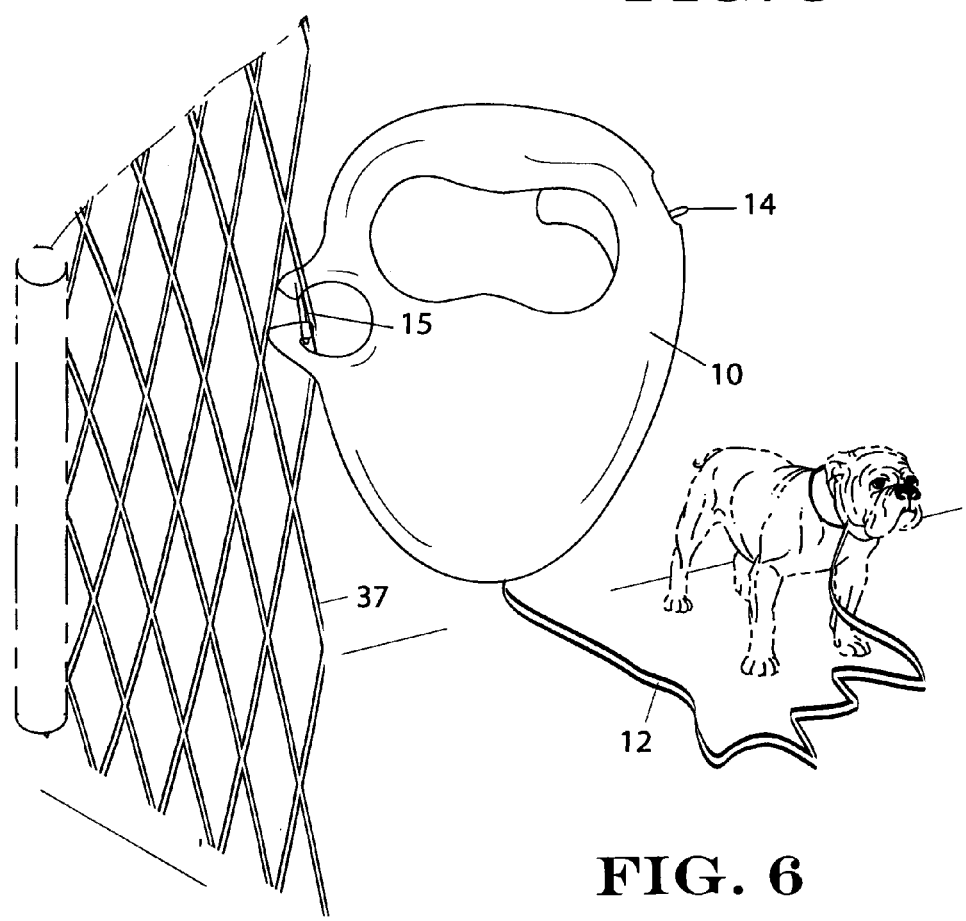
FIG. 6 shows the retractable leash tethered to a fence.

The leash device is shown in FIG. 5 tether to a fixed object 36, such as a tree, for leaving the animal alone. Toggle lock 14 is engaged to prevent leash 12 from retracting or extending. Leash 12 is wrapped around object 36 and positioned inside clip 15. The leash device is shown in FIG. 6 tether to a fixed but relatively thin object 37, such as a wire fence, by engaging toggle lock 14 and clipping object with clip 15. Clip 15 may also be clipped to the clothing of the user for hands free use. Clip 15 may also be used for securing accessories such as poop bags, animal toys, etc.

FIGS. 7–8

Figure 7:
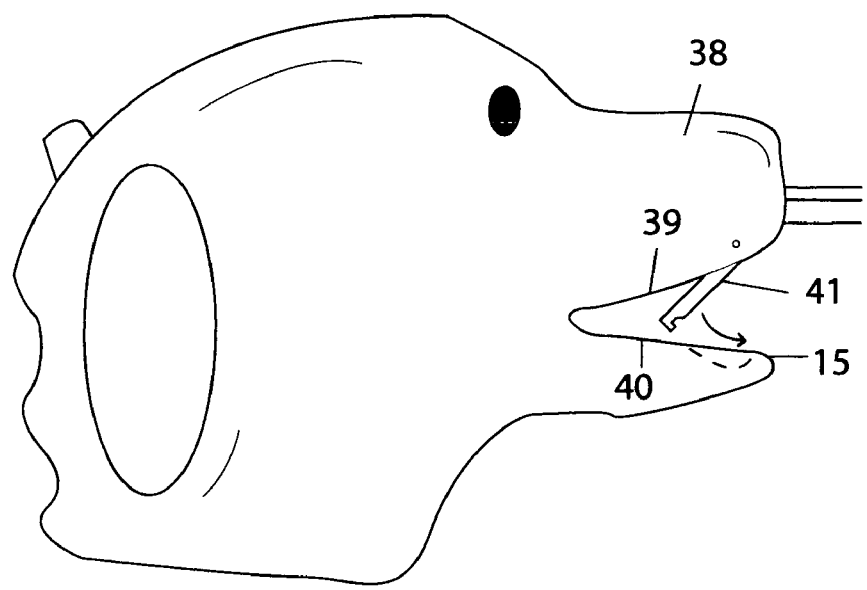
FIG. 7 shows an alternative clip.
Figure 8:
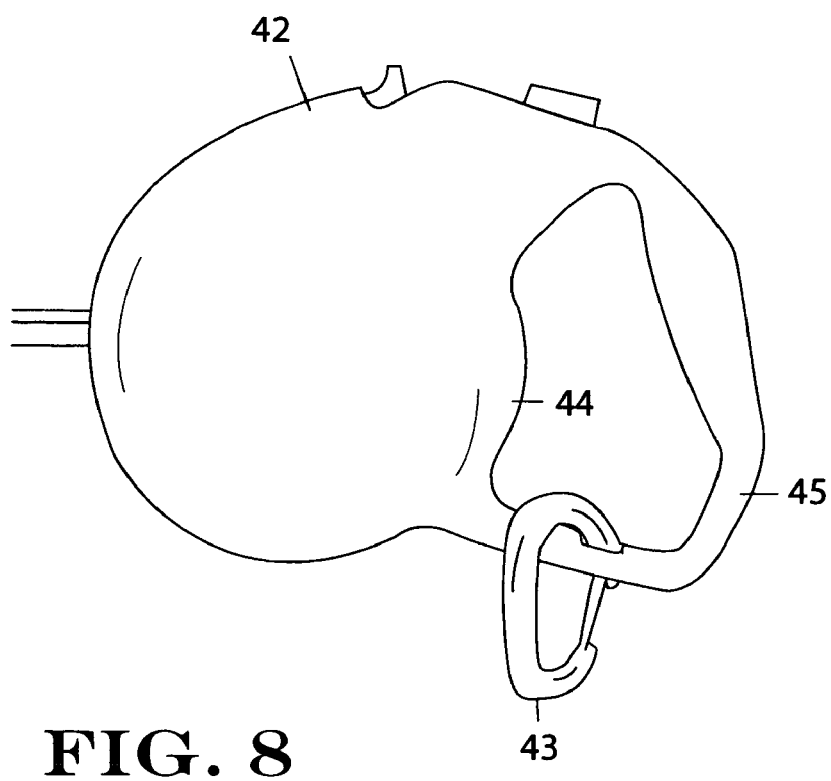
FIG. 8 shows another alternative clip.

An alternative embodiment of the leash device is shown in FIG. 7. It is comprised of a dog's head shaped housing 38. A clip 39 is comprised of an open mouth shaped notch 40 with a hinged gate 41 pivoted to the upper part of notch 40. Another alternative embodiment shown in FIG. 8 is comprised of a housing 42 and separate clip 43 attached to a hole 44, such as the loop defined by a handle 45. Clip 43 may be comprised of a karabiner.

FIG. 9

Figure 9:
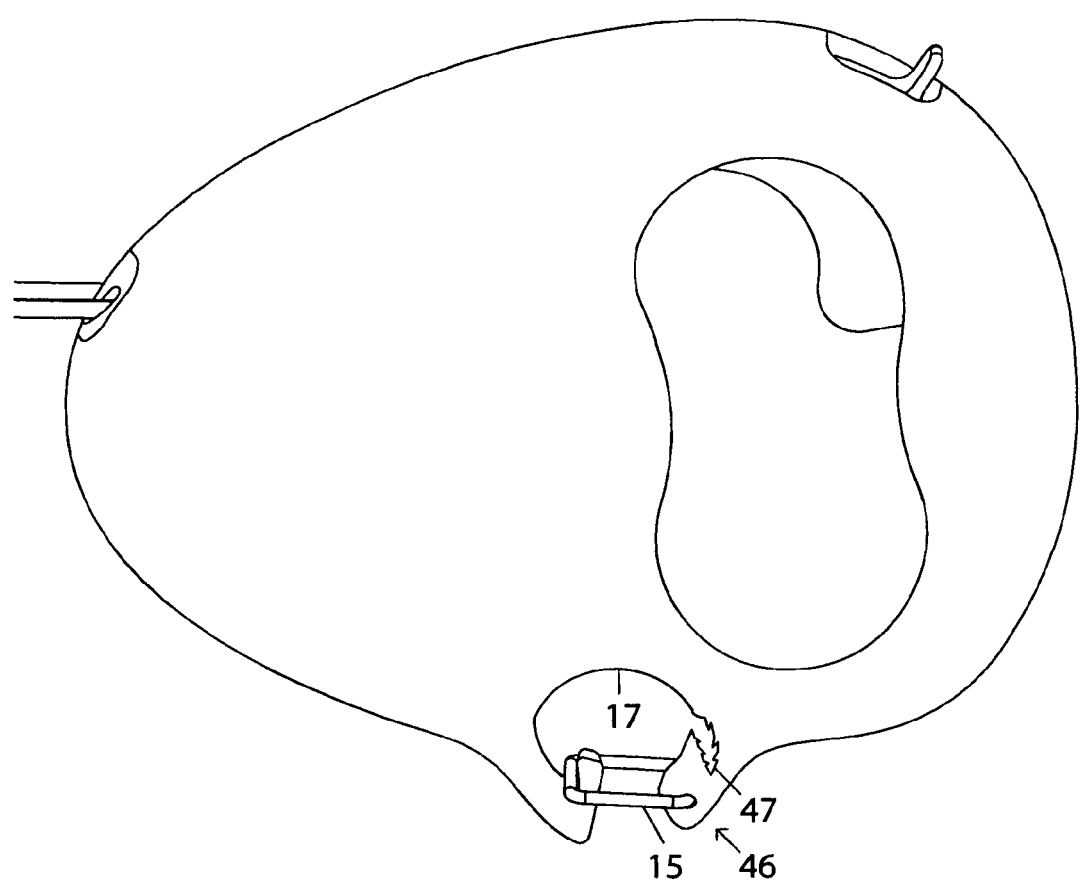
FIG. 9 shows a leash securing device for making a loop of a fixed length in the leash.

FIG. 9 shows a leash securing device 46 for making a loop of a fixed length in leash 12. When leash 12 is wrapped around a fixed object and secured to clip 15, an intermediate portion of leash 12 is secured in leash securing device 46 to fix the length of the loop formed around fixed object. Therefore, leash 12 is prevented from tightening around the fixed object, and allowed to rotate around the fixed object when the animal walks around the fixed object to avoid having leash 12 wrapped more and more around the fixed object.

In this example leash securing device 46 is comprised of a toothed slot 47 inside notch 17 within which leash 12 is wedged. Alternatively, leash securing device 46 may be comprised of a spring loaded grip which grips leash 12, holes in leash 12 and a pin attached to housing for mating with one of the holes, etc.

Although the foregoing description is specific, it should not be considered as a limitation on the scope of the invention, but only as an example of the preferred embodiment. Many variations are possible within the teachings of the invention. Therefore, the scope of the invention should be determined by the appended claims and their legal equivalents, not by the examples given.

We claim:

1. A retractable leash device, comprising:
   a housing;
   a reel in said housing;
   a leash wound around said reel and extendable from said housing;
   a spring biasing said reel to retract said leash as slack occurs; and a momentary unidirectional lock engaging said reel to prevent reel rotation in a release direction, while permitting free reel rotation in a retract direction as slack occurs during engagement of the momentary unidirectional lock with said reel; and a toggle lock in said housing slidable between an unlocked position disengaged from said reel, and a locked position engaged with said reel to prevent reel rotation in either direction.

2. The retractable leash device of claim 1, wherein said momentary unidirectional lock is comprised of a ratchet movable into engagement with unidirectional teeth on said reel to prevent reel rotation in the release direction, but permit reel rotation in the retract direction.

3. The retractable leash device of claim 1, further including a rotation damper engaged with said reel to limit retraction speed.

4. The retractable leash device of claim 1, further including a clip on said housing for clipping around said leash.

5. The retractable leash device of claim 1, further including a clip on said housing comprised of a notch in said housing, and a gate spanning an opening of said notch for clipping around said leash.

6. The retractable leash device of claim 1, further including a leash securing device attached to said housing, wherein when said leash is wrapped around a fixed object and fixedly secured in said leash securing device, a loop of a fixed length is formed in said leash for preventing said leash from wrapping tightly around said fixed object.

7. A retractable leash device, comprising:
a housing;
a reel in said housing;
a leash wound around said reel and extendable from said housing;
a spring biasing said reel to retract said leash;
a momentary unidirectional lock in said housing comprising:
 a hinged and spring loaded lever with an inner end biased away from said reel, and an outer end projecting from said housing;
 a hinged and spring loaded ratchet adjacent said inner end of said lever biased by said lever to a normally disengaged position away from said reel, wherein when said outer end of said lever is pressed, said inner end of said lever is moved toward said reel and pivots said ratchet into engagement with unidirectional teeth on said reel to prevent reel rotation in a release direction, but permit reel rotation in a retract direction;
a toggle lock in said housing comprising a sliding bar with an inner end movable between an unlocked position away from cogs on said reel, and a locked position between said cogs on said reel to prevent reel rotation in either direction;
a geared rotation damper engaged with a concentric gear around said reel to limit retraction speed; and a clip on said housing for clipping around said leash when said leash is wrapped around a fixed object for tethering said leash to said fixed object.

8. The retractable leash device of claim 7, wherein said clip is comprised of a notch in said housing, and a gate spanning an opening of said notch for clipping around said leash.

9. The retractable leash device of claim 7, further including a leash securing device attached to said housing, wherein when said leash is wrapped around a fixed object and fixedly secured in said leash securing device, a loop of a fixed length is formed in said leash for preventing said leash from wrapping tightly around said fixed object.

10. A retractable leash device, comprising:
a housing;
a reel in said housing;
a leash wound around said reel and extendable from said housing;
a spring biasing said reel to retract said leash; and
a momentary unidirectional lock movable into engagement with said reel to prevent reel rotation in a release direction, but permit reel rotation in a retract direction, wherein said momentary unidirectional lock is comprised of:
a hinged and spring loaded lever with an inner end biased away from said reel and an outer end projecting from said housing;
a hinged and spring loaded ratchet adjacent said inner end of said lever biased by said lever to a normally disengaged position away from said unidirectional teeth on said reel, wherein when said outer end of said lever is pressed, said inner end of said lever is moved toward said reel and pivots said ratchet into engagement with said unidirectional teeth on said reel to prevent reel rotation in a release direction, but permit reel rotation in a retract direction.

11. A retractable leash device, comprising:
a housing;
a reel in said housing;
a leash wound around said reel and extendable from said housing;
a spring biasing said reel to retract said leash;
a momentary unidirectional lock movable into engagement with said reel to prevent reel rotation in a release direction, but permit reel rotation in a retract direction; and
a toggle lock in said housing comprised of a sliding bar with an inner end movable between an unlocked position away from cogs on said reel, and a locked position between said cogs on said reel to prevent reel rotation in either direction.

* * * * *